Jan. 12, 1965 J. GRABOWSKI 3,165,309
CLAMPING MECHANISMS
Filed Sept. 13, 1962 6 Sheets-Sheet 4

INVENTOR.
JERZY GRABOWSKI
BY
William A. Zalesak
ATTORNEY

Jan. 12, 1965    J. GRABOWSKI    3,165,309
CLAMPING MECHANISMS

Filed Sept. 13, 1962    6 Sheets-Sheet 5

INVENTOR.
JERZY GRABOWSKI
BY
William A. Zalesak
ATTORNEY

Jan. 12, 1965   J. GRABOWSKI   3,165,309
CLAMPING MECHANISMS
Filed Sept. 13, 1962   6 Sheets-Sheet 6

INVENTOR.
JERZY GRABOWSKI
BY
William A. Jalesak
ATTORNEY

United States Patent Office 3,165,309
Patented Jan. 12, 1965

3,165,309
CLAMPING MECHANISMS
Jerzy Grabowski, West Caldwell, N.J., assignor to Tri-Ordinate Corporation, a corporation of New Jersey
Filed Sept. 13, 1962, Ser. No. 223,441
7 Claims. (Cl. 269—107)

My invention relates to a clamping apparatus or fixture having a plurality of clamping elements or jaws which automatically exert equal pressure against a work piece at all points of contact.

In manufacturing, certain tolerances may be allowed in different formed parts or work pieces to be machined, for example, in succesive stages, to make the part to be worked on economical to manufacture. There are many cases, however, where it is necessary, for manufacturing purposes, to design a part to close tolerances so that the part may be properly located and accurately held during successive operations. Conventional apparatus is not capable of accurately and firmly holding for further operations, such as machining, parts which are not made to close tolerances.

A further difficulty with conventional clamping apparatus is that the clamping jaws or members wear. This further aggravates the problem, because although the work pieces may be made to close tolerances uneven clamping, due to wear, causes unequal pressure of the clamping members or elements on the work pieces, permitting movement of the work pieces and resulting in inaccurate finished parts.

It is therefore an object of my invention to provide a clamping apparatus or fixture for work pieces to be machined, in successive stages for example, which apparatus will eliminate the necessity of forming the work pieces to the previously necessary close tolerances, thus resulting in more economically manufactured parts.

A further object of my invention is to provide a clamping apparatus having clamping elements which automatically exert equal pressure against a work piece at all points of contact.

A still further object of my invention is to provide such a clamping fixture or apparatus wherein wear of the clamping members is automatically compensated for.

Another object of my invention is to provide a clamping fixture or apparatus capable of clamping a work piece at all points of contact with equalized pressure even though the work piece may vary in dimensions due to previous machining.

Briefly, one form of apparatus made according to my invention includes a supporting structure including a frame supporting a clamp supporting member. The clamp supporting member or plate includes a work supporting or locating portion or surface on which the work piece is supported. The supporting member is also provided with positioning or banking members against which a work piece is held during operations. A pair of clamping members are slidably mounted for vertical movement on the supporting member adjacent said banking members. A pair of pivoted clamping members are mounted on said supporting member opposite to said banking members and between said slidably mounted clamping members. A movable plate is positioned within the frame below the clamping members. The slidable clamping members are connected to the plate by spherical rod end bearings. A swivelling bar is mounted on the plate and has its end connected to the pivoted clamping members by spherical rod end bearings. The plate is connected to a hydraulic cylinder by a bell crank to be operated by the hydraulic cylinder. The floating parts result in equalization of the pressure of the clamping members. Modifications may include only longitudinally movable clamping members or pivoted clamping members.

Figure 1:
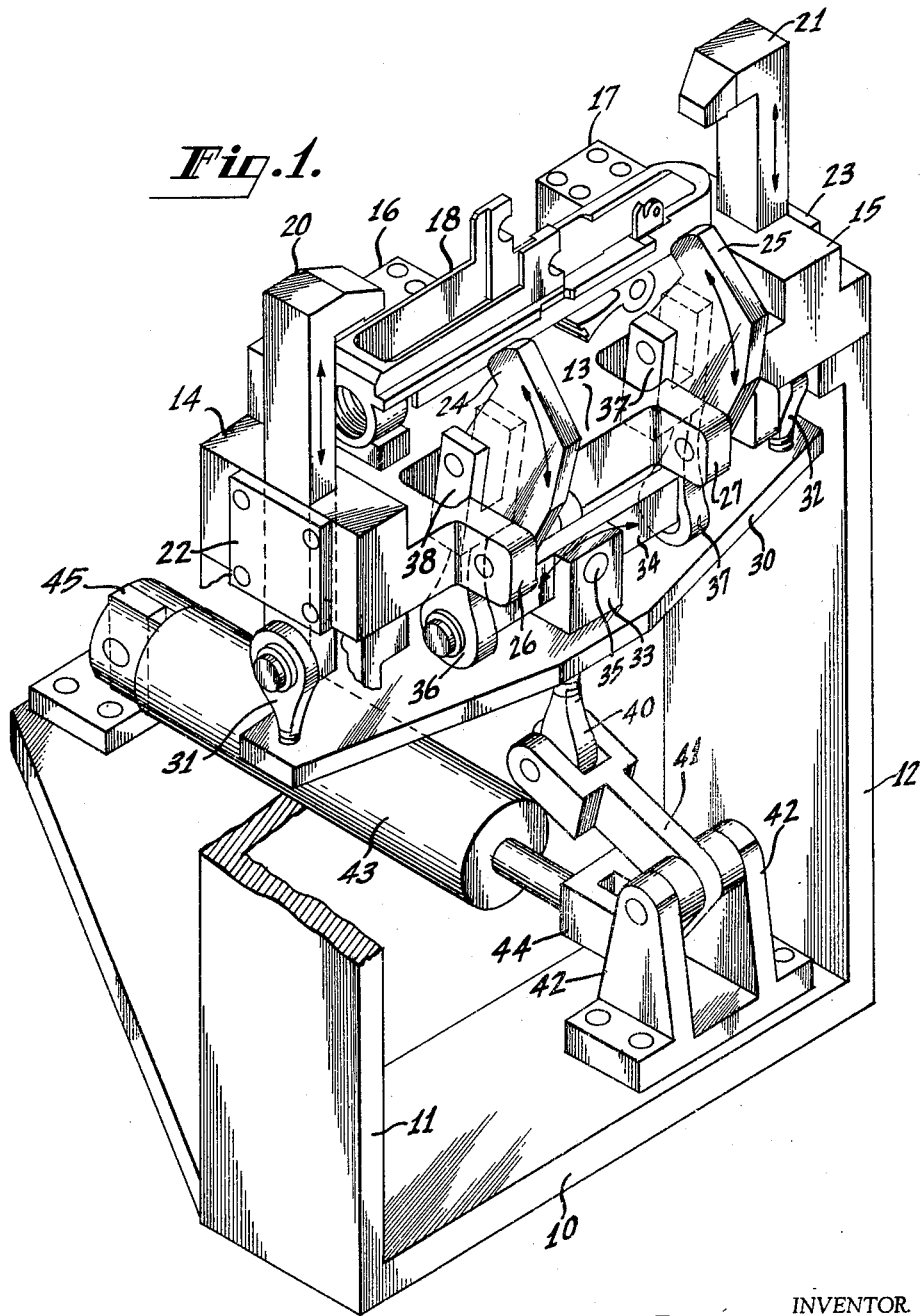
FIG. 1 is a perspective view of apparatus made according to my invention in open position.

Referring to FIG. 1, apparatus made according to my invention includes a frame having a base 10. A pair of oppositely disposed standards 11, 12 are fixed to the base and have attached to the upper ends a clamp supporting member or plate 13 having bracket-like portion 14, 15 at the opposite ends thereof. Mounted on one side of plate 13 are a pair of backing or banking members 16, 17 against which a work piece 18 may be clamped during operations, the work piece being supported on the supporting surface of the clamp supporting plate 13.

Longitudinally slidable clamping members 20, 21 are slidably mounted in the bracket portions 14 and 15, for movement vertically toward and from the work piece 18, being held in the bracket portions by plates 22 and 23.

Swivelling clamps 24 and 25 are pivotally mounted in the yoke portions 26–27 on the clamp supporting plate 13 and can be rotated toward and from the work piece 18 to clamp the work piece against the banking plates 16, 17.

Mounted below the clamp supporting member 13 and between the standards 11 and 12 is an elongated movable plate 30 which has secured to its ends a pair of oppositely disposed spherical rod end bearings 31 and 32 attached to the slidable clamps 20 and 21.

Mounted midway of plate 30 is a swivelling block 33 pivotally supporting swivel bar 34 by means of pin 35. At the ends of the swivel bar 34 are a pair of spherical rod end bearings 36 and 37. These bearings are connected to clamps 24 and 25 by means of yoke members 38 and 39.

The plate 30 is connected by spherical rod end bearing 40 and bell crank 41 pivotally supported in yoke 42 to the hydraulic piston 43 by yoke 44. Hydraulic piston 43 is pivotally supported in yoke 45.

The fixture is so arranged that by balancing the location of the spherical rod end bearings 31 and 32 with the swivelling block 33 the clamps 24 and 25 will first apply pressure on work piece 18 against banking plates or stops 16 and 17 before the pressure of slidable clamps 20 and 21 is fully applied.

Apparatus made according to this invention provides a floating mechanism, and causes the pressure of the clamp members to be equalized so that pressure of the clamps against the work piece is equal at all points where pressure is applied regardless of the variations in sizes of the work pieces. Without the floating members of the pressure clamps, any variation in the size of the work piece would allow all of the pressure to be applied by one clamp only. With apparatus made according to my invention and described above, the applied pressure is distributed equally to all the different clamping points.

Figure 2:
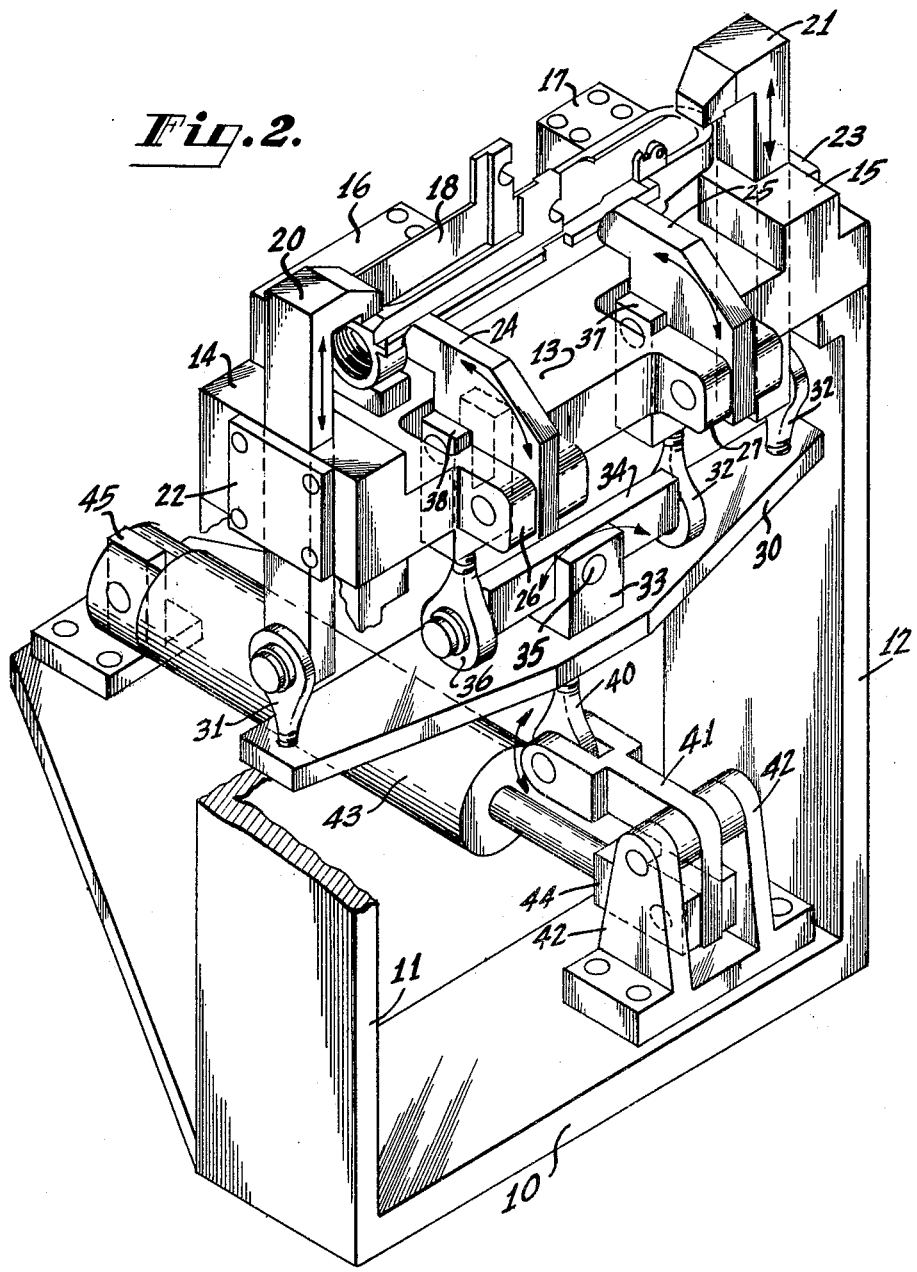
FIG. 2 is a perspective view showing the apparatus in closed position.
Figure 3:
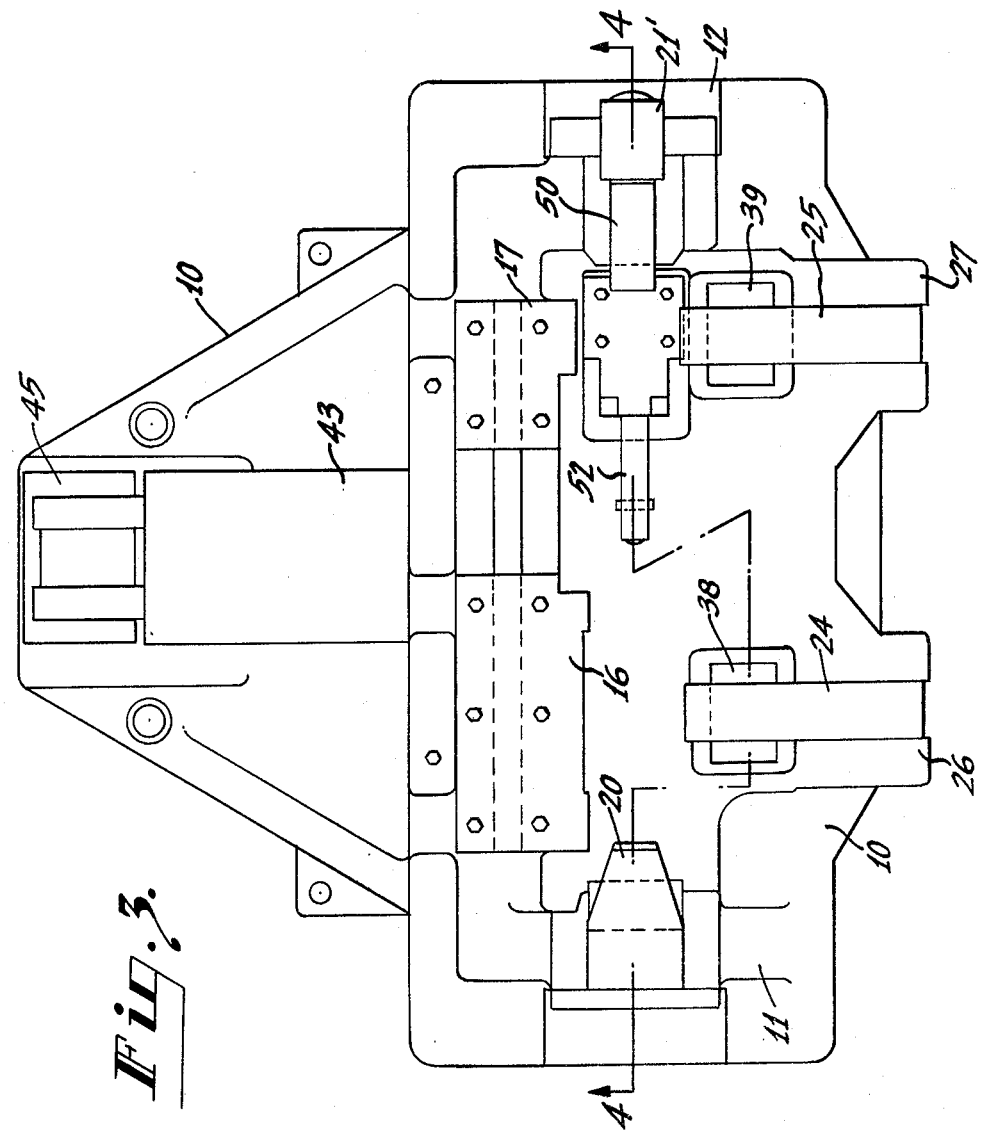
FIG. 3 is a plan view of the apparatus shown in FIGS. 1 and 2 in slightly modified form.
Figure 4:
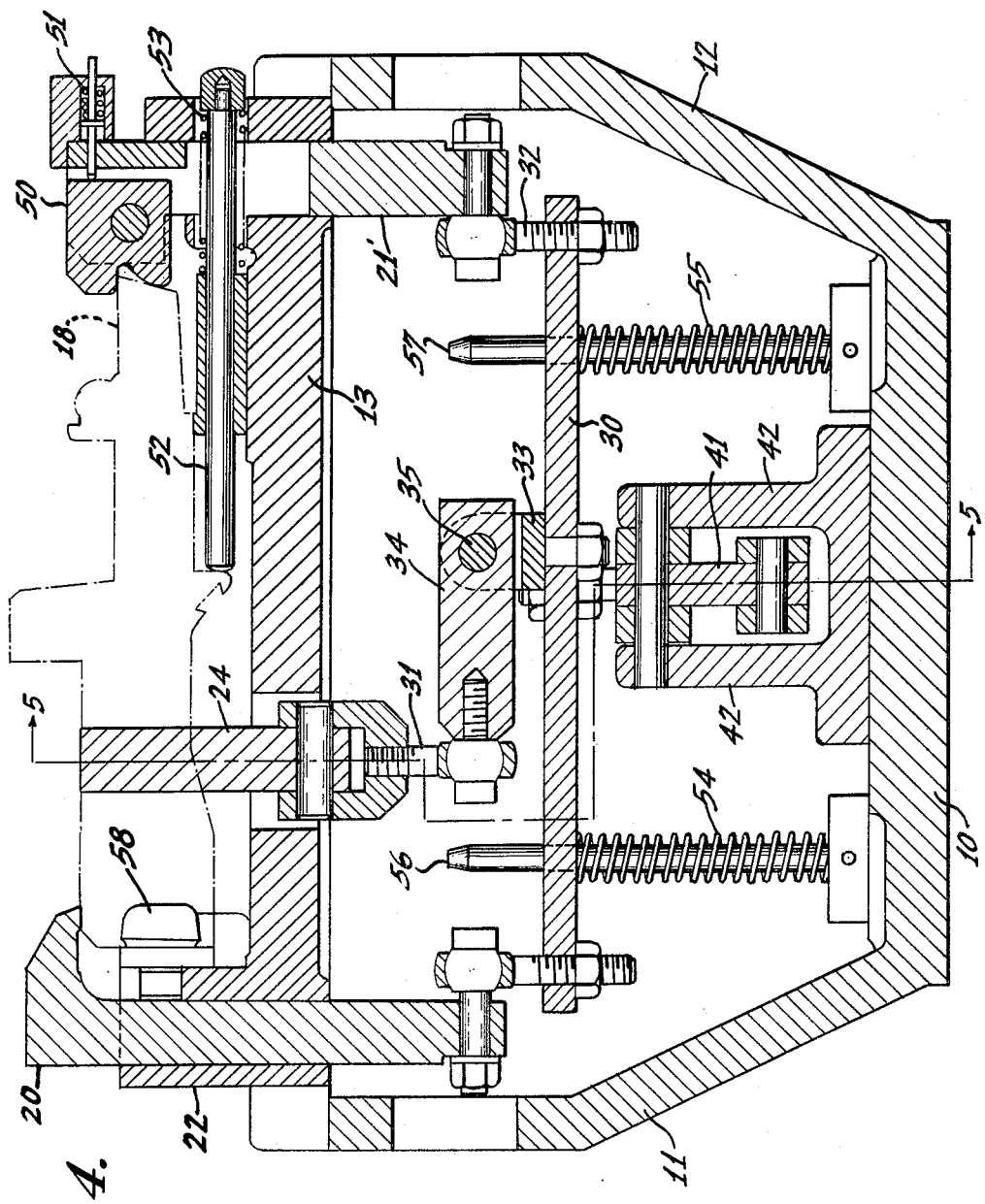
FIG. 4 is a vertical section taken along lines 4—4 of FIG. 3.
Figure 5:
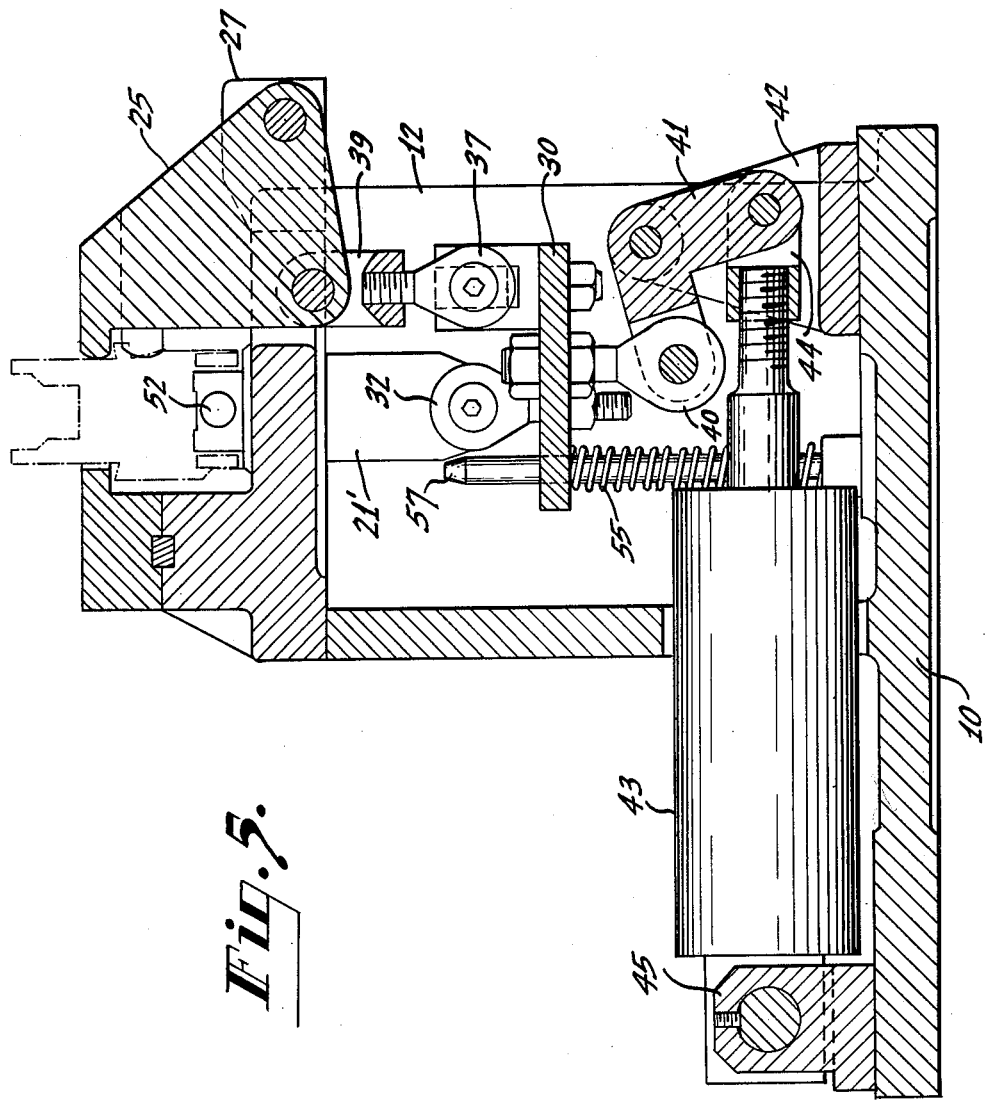
FIG. 5 is a vertical section taken along the lines 5—5 of FIG. 4.

In FIGS. 3, 4, and 5 is shown apparatus substantially like that shown in FIGS. 1 and 2 but with slight modifications. Like numbers indicate like parts in all figures.

In the modification, the clamping member 21 has been modified by the addition of a pivoted spring pressed work engaging piece, and a spring pressed work engaging pin as further refinements.

Referring specifically to FIG. 4, the slidable clamp 21' is provided at its upper end with the pivoted jaw 50 biased by spring 51 to rotate counterclockwise to engage work piece 18. The pivoted jaw 50 will engage the work piece so that it not only clamps downwardly but also presses the work piece against the stop 58. This dual motion of the pivoting jaw 50 provides sufficient pressure on the work piece against stop 58 so that when under great pressure the work piece will not be moved away from the stop.

A slidable pin 52 mounted on plate 13 is biased against work piece 18 by means of spring 53. The slidable pin is used for rough locating of the work piece manually. It acts as a pusher to push the work piece against the stop 58 prior to hydraulic power being applied, so that the work piece is in position and held to permit the pivoting jaw 50 to properly engage the work piece 18. The jaw 50 and pin 52 are improvements but not necessary to the practice of my invention.

In addition, biasing springs 54 and 55 mounted on spring guides 56 and 57 extending through floating plate 30 and fixed to base 10 tend to rotate plate 30 clockwise.

While springs 54 and 55 are not essential to the practice of my invention, they help in some instance to balance the plate 30, so that jaws 24 and 25 are positively contacting the work piece and apply pressure before clamps 20 and 21 move downwardly. These springs permit pivoting jaws 24 and 25 to apply a slight pressure on the work piece before clamps 20 and 21 contact the work piece. As a result, the work piece is properly banked against banking elements 16 and 17 before clamps 20 and 21 clamp the work piece so that horizontal movement does not take place thereafter.

Figure 6:
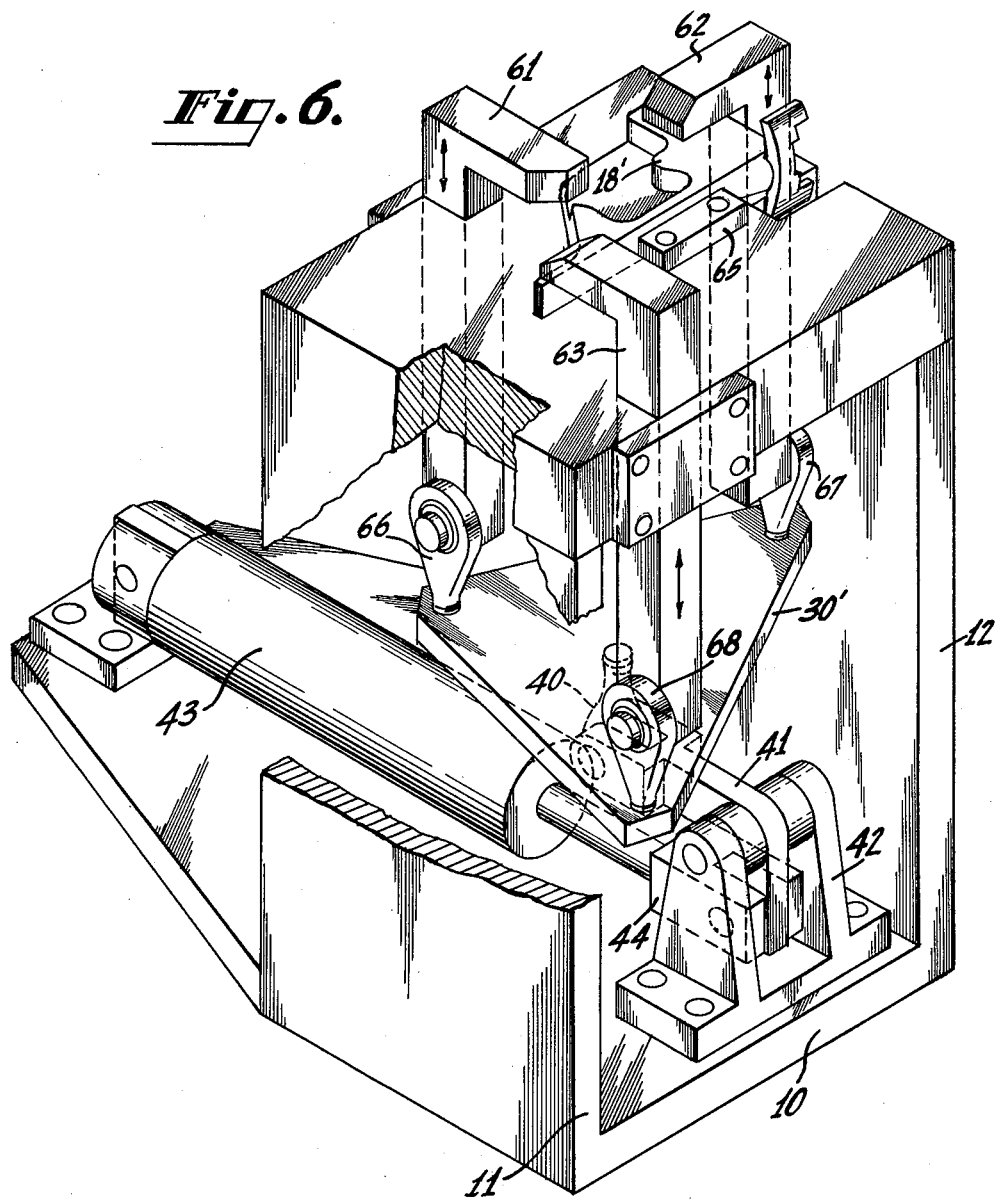
FIG. 6 is a view in perspective with parts broken away of a still further modification of my invention.

The modification shown in FIG. 6 includes longitudinally slidable members, at least three but in which the clamping pressures are all equalized. Again like numerals indicate like parts.

The plate 30' slidably supports the longitudinally slidable clamping members 61, 62 and 63. The work piece 18' is placed against backing key 65. The clamping members 60, 61 and 62 are connected to plate 30' by rod end spherical bearings 66, 67 and 68. The plate 30' is connected to the bell crank 41 by the main rod end spherical bearing 41. The resultant forces again apply equalized pressure to all points of contact by the clamping members. This principle can be extended to an apparatus which utilizes only pivoted clamping members.

What is claimed is:

1. A clamping fixture comprising a supporting structure, a pair of oppositely disposed clamping members slidably mounted on said structure, a pair of pivoted clamping members pivotally mounted on said structure and positioned between said slidable clamping members, said supporting structure having banking means oppositely disposed to said pivoted clamping members, a movable plate mounted on said supporting structure, spherical rod end bearings connected to said plate and to said slidable clamping members, a swivelling bar mounted on said plate, end bearings connected between the ends of said swivelling bar and said pivoted clamping members and means connected to said plate for moving said plate to cause said pivoted clamping members and said slidable clamping members to contact a work piece mounted on said supporting structure.

2. A clamping fixture comprising a supporting structure, a pair of oppositely disposed clamping members slidably mounted on said supporting structure, a pair of pivoted clamping members pivotally mounted on said structure and positioned between said slidable clamping members, a movable plate mounted on said supporting structure, spherical rod end bearings connected to said plate and to said slidable clamping members, a swivelling bar mounted on said plate, end bearings connected between the ends of said swivelling bar and said pivoted clamping members and means connected to said plate for moving said plate to cause said pivoted clamping members and said slidable clamping members to contact a work piece mounted on said supporting structure.

3. A clamping fixture comprising a frame, a clamp supporting member mounted on said frame, a pair of oppositely disposed clamping members slidably mounted on said supporting member, a pair of pivoted clamping members pivotally mounted on said supporting member and positioned between said slidable clamping members, said supporting member having banking means oppositely disposed to said pivoted clamping members, a movable plate positioned within said frame, spherical rod end bearings connected to said plate and to said slidable clamping members, a swivel block mounted on said plate and positioned between said spherical rod end bearings, a swivelling bar mounted on said swivel block, rod end bearings connected between the ends of said swivelling bar and said pivoted clamping members and means connected to said plate for moving said plate to cause said pivoted clamping members to first contact a work piece and press it against said banking means before said slidable clamping members fully apply pressure to said work piece mounted on said clamp supporting member.

4. A clamping fixture comprising a frame, work supporting means on said frame, a pair of oppositely disposed clamping members slidably mounted in said frame, a pair of pivoted clamping members pivotally mounted on said frame between said slidable clamping members, a movable plate positioned within said frame, means connected between said plate and said slidable clamping members, a swivelling bar mounted on said plate, means connected between the ends of said swivelling bar and said pivoted clamping members, and means connected to said plate for moving said plate to cause said pivoted clamping members and said slidable clamping members to contact a work piece mounted on said work supporting means.

5. A clamping assembly comprising a frame supporting a clamp supporting plate, at least three clamping members slidably mounted on said plate and movable between open and clamping positions, said clamp supporting plate being adapted to support a work piece adjacent said clamping members, a floating plate, spherical rod bearings connected between each of said clamping members and said floating plate for moving said clamping members toward and from clamping position while permitting relative movement between said clamping members to permit self-adjustment, and means connected to said floating plate for moving said plate.

6. A clamping fixture comprising a frame, a supporting member mounted on said frame, clamping members slidably mounted on said frame, and other clamping members pivotally mounted on said frame, said supporting member being adapted to support a work piece, a movable floating plate positioned on said frame, spherical rod end bearings connected between said plate and each of said clamping members, and means connected to said plate for moving said plate to cause said clamping members to contact a work piece mounted on said supporting member, said plate and spherical rod end bearings permitting relative movement and self-adjustment of said clamping members, whereby equal pressure is exerted on a work piece at all points of contact between said clamping members and said work piece.

7. A clamping assembly comprising a support, a first pair of oppositely disposed clamping members mounted on said support and movable between open and clamping positions, said support having means for supporting a work piece adjacent said clamping members, a pair of spaced pivoted clamping members on said support rotatable toward and from said work piece, a floating plate member, link mechanism including spherical bearings connected between the first pair of clamping members and said plate member, other means including a pivoted member on said floating plate member having link mechanism including spherical bearings connected to said last pivoted member and said pivoted clamping members, whereby said first pair of clamping members and said pivoted clamping members are self-adjusting, and means connected to said floating plate member for causing engagement of a work piece by all of said clamping members.

References Cited in the file of this patent

UNITED STATES PATENTS

| | | |
|---|---|---|
| 1,894,156 | Byington | Jan. 10, 1933 |
| 2,475,475 | Butterworth | July 5, 1949 |